3,197,021
RIBBED CONVEYOR BELT
Robert B. Williams, Wethersfield, Conn., assignor to The Russell Manufacturing Company, Middletown, Conn., a corporation of Connecticut
Filed Nov. 28, 1962, Ser. No. 240,678
1 Claim. (Cl. 198—193)

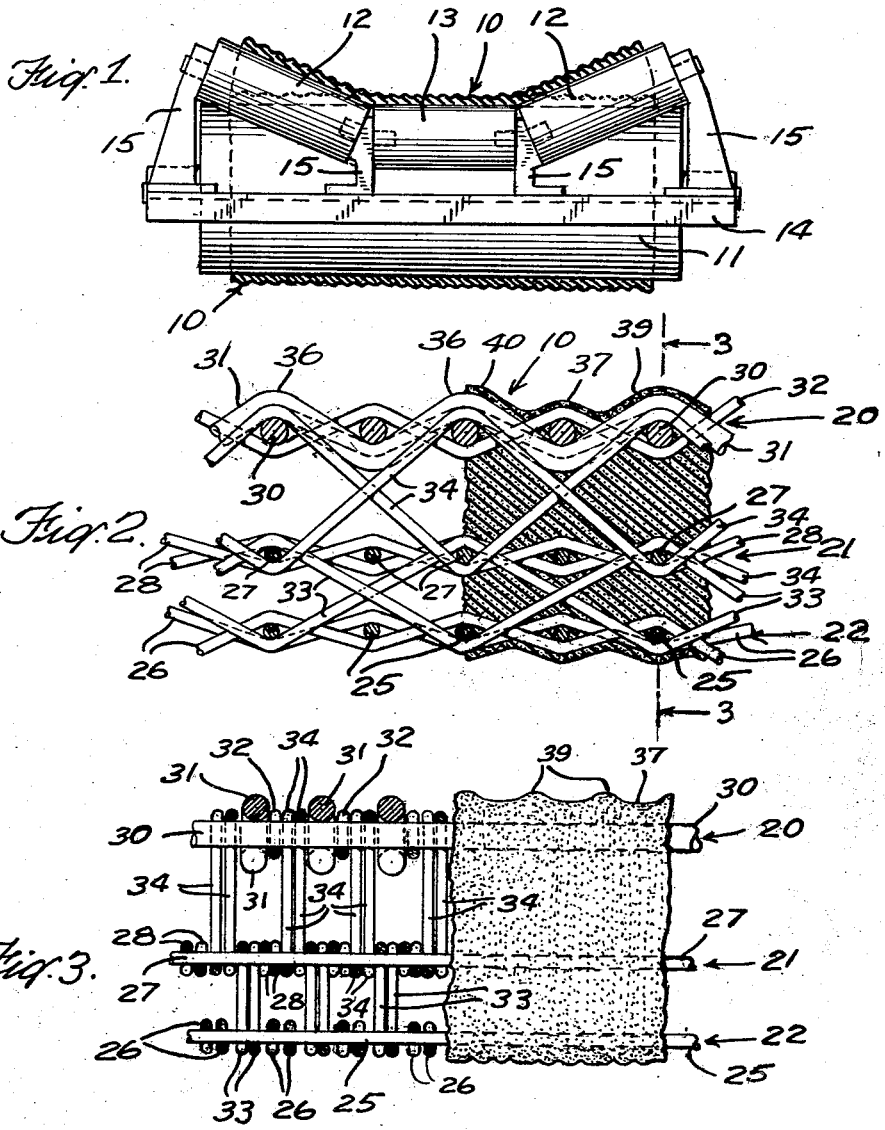

This invention relates to conveyor belts and has for an object to provide a conveyor belt having surface characteristics suited for picking up and transporting aggregate or the like at high rates of speed.

Another object is to provide a belt of the above type which is capable of repeating flexing both transversely and longitudinally for troughing and passing around high speed end rollers.

Another object is to provide a belt of the above type having improved surface characteristics and novel and improved features of construction.

Other objects and advantages will be apparent as the nature of the invention is more fully disclosed.

In accordance with this invention, the belt is formed in a plurality of plies, each consisting of filler yarns and warp chain yarns, the plies being bound together by binder yarns in an open loose weave which permits the belt to flex transversely for passing around end rollers of small diameter. Certain of the warp yarns of the upper ply are composed of yarns of larger size so that the ribs or ridges are formed across the surface of the belt in the zones where such heavier warp yarns pass over the fillers of the upper ply. The filler yarns of the upper ply may also be of larger diameter than the other filler yarns for the same purpose. The belt is then impregnated with a suitable resin and a surface layer of the same or a compatible resin bonded thereto and conforming to the ridges and valleys produced by the weave as above described. The entire construction provides an extremely flexible belt having surface which is adapted to pick up and grip aggregate or other fine material and quickly accelerate it to a high speed.

The nature of the invention will be better understood from the following description, taken in connection with the accompanying drawing in which a specific embodiment has been set forth for purposes of illustration.

In the drawing:

FIG. 1 is a transverse section through the conveyor system;

FIG. 2 is a warpwise section through the belt on a much larger scale illustrating the weave; and FIG. 3 is a weftwise section taken on the line 3—3 of FIG. 2.

Referring to the drawing more in detail the invention is shown as embodied in a conveyor belt 10 passing around an end roller 11 and over troughing rollers 12 and 13 which cause the belt to trough for receiving fine material such as aggregate to be conveyed thereby. The rollers are mounted on a suitable frame 14 by brackets 15 of standard construction.

Referring to FIGS. 2 and 3 the belt 10 is shown as composed of three plies 20, 21 and 22. The lower ply 22 is composed of filler shots 25 which are bound together by a pair of chain warps 26. The ply 21 is composed of filler shots 27 which are bound together by chain warps 28. The top ply 20 is composed of filler shots 30 which may be substantially heavier than the filler shots 25 and 27 and are bound together by chain warps 31 and 32. The chain warps 31 are substantially heavier than the other chain warps and may be of about the same thickness as the filler shots 30. The filler shots 25 and 27 are bound together by binder warps 33 and the filler shots 27 and 30 are bound together by binder warps 34.

In this way the three plies are secured together for providing a unitary belt structure although the weave is sufficiently loose or open to permit the belt to flex readily in passing around the end rollers. The heavy warp yarns 31 in passing over alternate filler yarns 30 form transverse ridges or ribs 36 separated by valleys 37 on the upper surface of the belt 10 which enable the belt to grip material such as aggregate and accelerate such material rapidly as the belt is fed along at relatively high speed. The crimp in the heavy warp yarns 31 gives an accordion effect which allows the belt to flex readily around the end rollers.

In a filler-wise direction each pair of heavy warp yarns 31 is separated by smaller warp yarns 32 and binder warp yarns 34. The binder warps and chain warps alternate weftwise in the lower plies 21 and 22.

The belt thus described is impregnated by a plastic resin of the thermosetting or thermoplastic type such as neoprene or polyvinylchloride. A surface layer 39 of the same material or of a compatible material is disposed over the surface of the belt and conforms to the ridges 36 and the valleys 37. The surface layer 39 may contain fibers 40 of asbestos or the like to impart surface friction which assists in the gripping and transporting of the aggregate or the like by the belt.

The above described belt, due to the binding of the plies together and the bonding of the surface layer, is capable of resisting the centrifugal force produced by passing around small diameter rollers at high speed and due to its weave is capable of repeated flexing for troughing and flattening followed by transverse flexing in its various flights.

What is claimed is:

A conveyor belt comprising a woven web having top, intermediate and lower plies, each ply comprising filler yarns and warp yarns woven together, a set of binder chain yarns binding each pair of adjacent plies together, the top ply having two sets of warp yarns, one of said sets being composed of yarns which are substantially thicker than the yarns of the other of said sets, said thicker yarns being woven over and under successive filler yarns of said ply, said other set of warp yarns being woven under and over said successive filler yarns to form with said first set a double warp chain and constituting a weave wherein the warp yarns which are woven over one set of alternate filler yarns of said top ply are substantially thicker than the warp yarns which are woven over the other set of alternate filler yarns and thereby form raised transverse ridges separated by intervening valleys on the surface of said top ply, the weave being sufficiently loose to permit the web to flex freely around a roller, said web being impregnated with a bonding resin and having a surface layer of such resin bonded thereto and conforming to the ridges and valleys of said top ply.

References Cited by the Examiner

UNITED STATES PATENTS

| | | | |
|---|---|---|---|
| 794,381 | 7/05 | Robin | 198—193 X |
| 989,952 | 4/11 | Dodge | 198—193 |
| 1,963,898 | 6/34 | Hainsworth | 139—408 |
| 2,270,154 | 1/42 | Whittier | 139—426 X |
| 2,303,762 | 12/42 | Reimel et al. | 198—198 |
| 2,742,059 | 4/56 | Watts | 139—409 |
| 3,000,771 | 9/61 | Runton | 154—52.1 |

FOREIGN PATENTS

| | | |
|---|---|---|
| 536,638 | 4/55 | Belgium. |
| 262,214 | 12/26 | Great Britain. |

SAMUEL F. COLEMAN, *Primary Examiner.*

RUSSELL C. MADER, *Examiner.*